United States Patent
Kawano (10) Patent No.: US 9,325,872 B2
(45) Date of Patent: Apr. 26, 2016

(54) IMAGE PROCESSING APPARATUS (71) Applicant: FUJI XEROX CO., LTD., Tokyo (JP)

(72) Inventor: Hiroyuki Kawano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/515,636

(22) Filed: Oct. 16, 2014

(65) Prior Publication Data

US 2015/0103362 A1    Apr. 16, 2015

(30) Foreign Application Priority Data

Oct. 16, 2013  (JP) .................................. 2013-215728
Sep. 22, 2014  (JP) .................................. 2014-192402

(51) Int. Cl.
*H04N 1/00* (2006.01)

(52) U.S. Cl.
CPC ....... *H04N 1/00702* (2013.01); *H04N 1/00718* (2013.01); *H04N 1/00742* (2013.01); *H04N 1/00769* (2013.01)

(58) Field of Classification Search
None
See application file for complete search history.

(56) References Cited

U.S. PATENT DOCUMENTS

| 6,005,977 A | 12/1999 | Tanimizu et al. | |
| 2013/0044342 A1* | 2/2013 | Kaneko et al. | 358/1.13 |
| 2013/0114102 A1* | 5/2013 | Yamamoto | 358/1.14 |
| 2013/0250369 A1* | 9/2013 | Kitai et al. | 358/405 |
| 2014/0314281 A1* | 10/2014 | Kojima et al. | 382/112 |

FOREIGN PATENT DOCUMENTS

| JP | H07-249122 A | 9/1995 |
| JP | H09-35063 A | 2/1997 |
| JP | 2000-082135 A | 3/2000 |

* cited by examiner

Primary Examiner — Thomas D Lee
(74) Attorney, Agent, or Firm — Oliff PLC

(57) ABSTRACT

An image processing apparatus, includes: an acceptance unit that accepts image data and reading data; an extraction unit that extracts rectangular images by segmenting one image of the image data and the reading data; a first searching unit that selects at least one of the rectangular images extracted by the extraction unit, set a search range calculated from the error, searches for a matching position of the selected rectangular image in the other image of the image data and the reading data; an estimation unit that estimates a matching position of a rectangular image in the other image on the basis of the matching position of the selected rectangular image in the other image; and a second searching unit that searches for a matching position of the other rectangular image in the other image using the matching position estimated by the estimation unit as a reference.

8 Claims, 10 Drawing Sheets

IMAGE PROCESSING APPARATUS

CROSS-REFERENCE TO RELATED APPLICATIONS

This application is based on and claims priority under 35 U.S.C. 119 from Japanese Patent Application No. 2013-215728 filed on Oct. 16, 2013, and Japanese Patent Application No. 2014-192402 filed on Sep. 22, 2014.

BACKGROUND

Technical Field

The present invention relates to an image processing apparatus.

SUMMARY

According to an aspect of the present invention, it provides an image processing apparatus, including: an acceptance unit that accepts image data and reading data read from a medium on which an image of the image data is formed; an extraction unit that extracts rectangular images by segmenting one image of the image data and the reading data to have a size calculated based on an error which occurs from an image forming apparatus forming the image of the image data on the medium and/or an image reading apparatus reading the medium; a first searching unit that selects at least one of the rectangular images extracted by the extraction unit, set a search range calculated from the error, searches for a matching position of the selected rectangular image in the other image of the image data and the reading data; an estimation unit that estimates a matching position of a rectangular image in the other image on the basis of the matching position of the selected rectangular image in the other image; a second searching unit that searches for a matching position of the other rectangular image in the other image using the matching position estimated by the estimation unit as a reference; and a comparison unit that compares the rectangular image extracted by the extraction unit with the rectangular image in the other image at the position searched by the first and second searching units.

BRIEF DESCRIPTION OF THE DRAWINGS

Exemplary embodiment(s) of the present invention will be described in detail based on the following figures, wherein.

DETAILED DESCRIPTION

Hereinafter, an example of one embodiment suitable to realize the present invention will be described with reference to the accompanying drawings.

Figure 1:
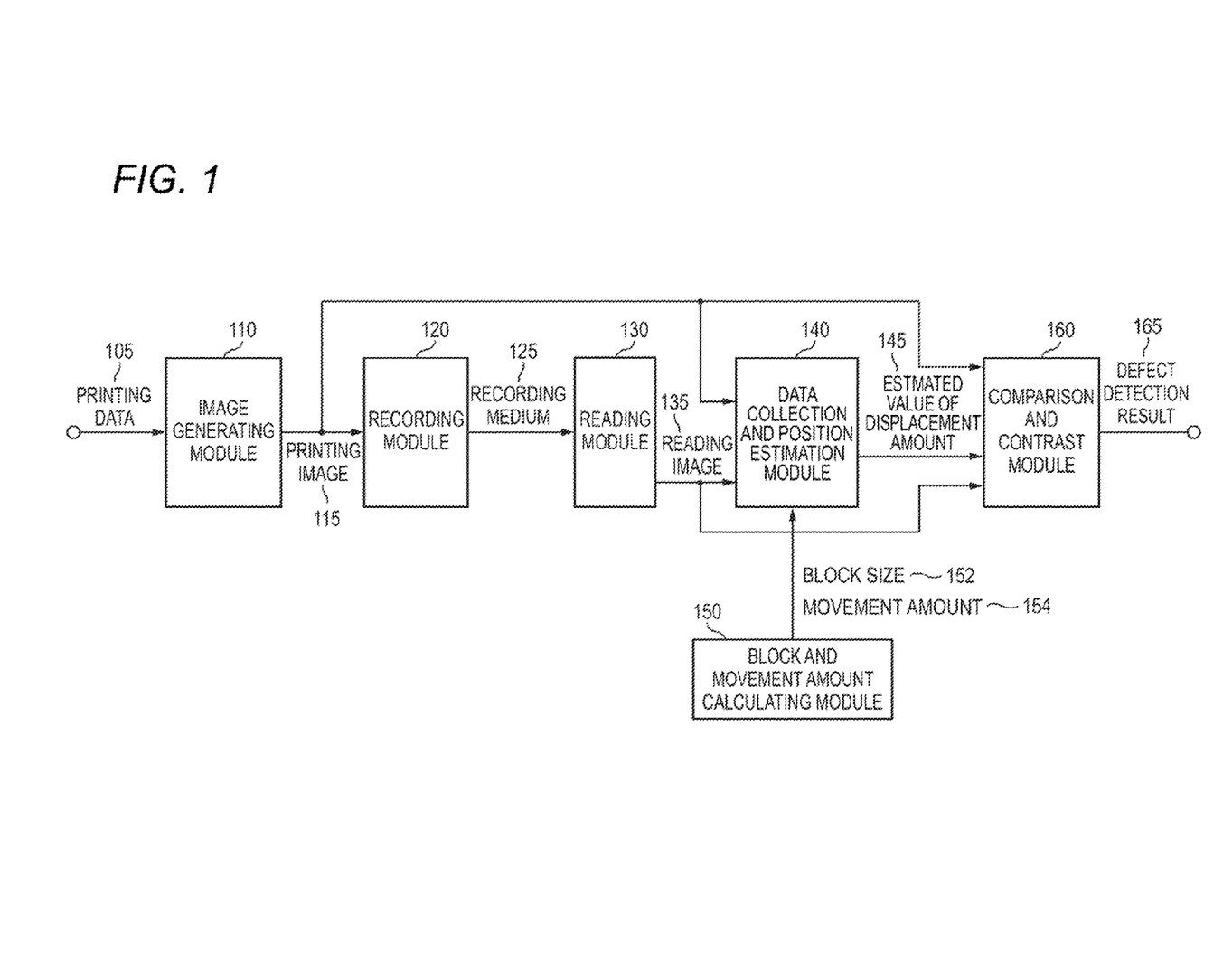
FIG. 1 is a conceptual module configuration diagram of an embodiment of the present invention.

FIG. 1 illustrates a conceptual module configuration diagram of a configuration example according to the present embodiment.

Meanwhile, a module generally indicates parts such as logically separable software (computer program) and hardware. Therefore, the module according to the present embodiment indicates not only a module in the computer program but also a module in a hardware configuration. For this reason, the present embodiment describes computer programs (program allowing a computer to execute each order, program executing a computer as each means, and program allowing a computer to carrying out each function), a system, and a method functioning as these modules. However, for convenience of explanation, 'storing', 'store', and words equivalent thereto are used, and in the case in which the embodiment is the computer program, these words mean storing the computer program in a storage apparatus or controlling to store the computer program in the storage apparatus. Further, the modules may be allowed to one-to-one correspond to the functions, but in mounting, one module may be allowed to be configured as one program, a plurality of modules may be allowed to be configured as one program, and to the contrary, one module may be allowed to be configured as a plurality of programs. Further, the plurality of modules may be allowed to be executed by one computer and according to a computer in a dispersion or parallel environment, one module may be allowed to be executed by the plurality of computers. Meanwhile, one module may be allowed to include another module. Further, hereinafter, a 'connection' is used even in the case of a logical connection (transfer and instruction of data, reference relationship between data, and the like), in addition to a physical connection. A 'predetermined' means that an object is defined prior to being processed, and even after processing according to the present embodiment starts as well as before the processing according to the present embodiment starts, if the object is not yet processed, a 'predetermined' is used including a meaning that object is defined depending on a situation and a state at that time or a situation and a state till then. When a plurality of 'predetermined values' is present, different values may be allowed and more than two values (of course, including all values) may be allowed to be the same. Further, a description having a meaning named 'if A, B is performed' is used as a meaning of 'when determined to be A by determining whether or not it is A, B is performed'. However, the case in which it is unnecessary to determine whether or not it is A is ruled out.

A system or an apparatus includes not only a configuration in which a plurality of computers, hardware, an apparatus, and the like are connected to one other by a communication means such as a network (including communication connection of one-to-one correspondence), but also a case which is realized by one computer, hardware, an apparatus, and the like. 'Apparatus' and 'system' are used as a term having the same meaning. As a matter of course, a 'system' does not include components belonging to only a social 'structure' (social system) which is an artificial engagement.

Whenever each module performs processing or in the case in which a plurality of processings is performed within a module, targeted information is read from a storage apparatus for each processing, the processing is performed, and then the processed result is delivered to the storage apparatus. Therefore, a description about reading the targeted information from the storage apparatus before processing is performed and transferring the targeted information after processing to the storage apparatus may be omitted. Meanwhile, examples of the storage apparatus herein may include a hard disk, a random access memory (RAM), an external storage medium, a storage apparatus through a communication line, a register within a central processing unit (CPU), and the like.

An image processing system including an image processing apparatus according to the embodiment compares an image data with a reading data. As illustrated in an example of FIG. 1, the image processing system includes an image generating module 110, a recording module 120, a reading module 130, a data collection and position estimation module 140, a block and movement amount calculating module 150, and a comparison and contrast module 160.

The image generating module 110 is connected to the recording module 120, the data collection and position estimation module 140 and the comparison and contrast module 160. The image generating module 110 converts a printing data 105 into a printing image 115 which is an image data. The conversion processing includes image conversion processing required for printing which includes rasterize and color space conversion. The image generating module 110 performs processing of converting the printing data 105 described as a PDL such as a portable document format (PDF) (registered mark) into a raster image (printing image 115) which may be recorded on a medium (paper) with a printing machine and a printer. As a mounting form, there are dedicated hardware and software which is operated on a computer such as a personal computer (PC). The printing image 115 which is a processed result is delivered to the recording module 120, the data collection and position estimation module 140 and the comparison and contrast module 160.

The recording module 120 is connected to the image generating module 110 and the reading module 130. The recording module 120 records the printing image 115 on a recording medium 125. That is, an image of the image data is formed on the recording medium 125 which is a medium. This is so-called printing, or print out and the recording module 120 is realized as a printer which is an image forming apparatus.

The reading module 130 is connected to the recording module 120, the data collection and position estimation module 140 and the comparison and contrast module 160. The reading module 130 converts the printing image 115 on the recording medium 125 into a reading image 135 by photoelectric conversion, and the like. That is, the reading image 135 which is the data read from the recording medium 125 is generated. This is so-called scan out and the reading module 130 is realized as a scanner which is an image reading apparatus. The reading module 130 delivers the reading image 135 to the data collection and position estimation module 140 and the comparison and contrast module 160.

Figure 3:
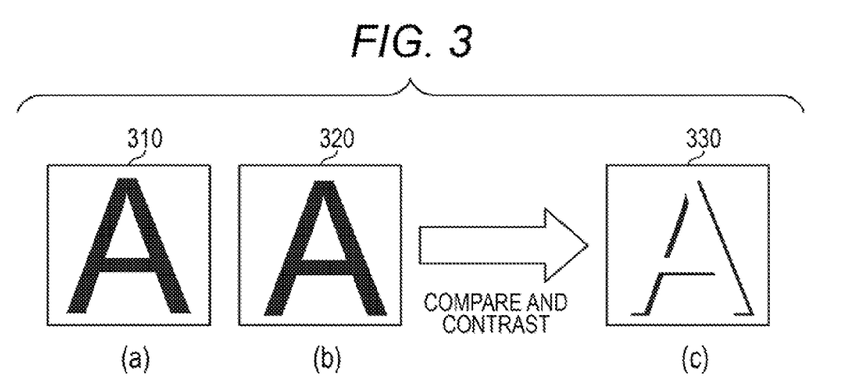
FIG. 3 is an explanation diagram illustrating a processing example in a data collection and position estimation module.

The data collection and position estimation module 140 is connected to the image generating module 110, the reading module 130, and the block and movement amount calculating module 150, and the comparison and contrast module 160. The data collection and position estimation module 140 selects at least one block image extracted from one image of the printing image 115 and the reading image 135. The data collection and position estimation module 140 sets a search range calculated from an error and searches for a matching position of the selected block image within the other image of the printing image 115 and the reading image 135. And then, the data collection and position estimation module 140 estimates a corresponding position of the non-selected block image within the other image on the basis of the matching position of the selected block image within the other image. And, the data collection and position estimation module 140 delivers the estimated position (estimated value of deviation amount) to the comparison and contrast module 160. First, the estimation processing of the corresponding position within the other image for the block image will be described with reference to FIGS. 3 and 4. FIG. 3 is an explanation diagram illustrating the processing example in the data collection and position estimation module 140.

1) As illustrated in an example of (a) and (b) of FIG. 3, the printing data 115 and the reading data 135 are each segmented into a rectangle (hereinafter, referred to as block) to generate a printing block image 310 and a reading block image 320. That is, into the block generated based on the error which may occur from the recording module 120 and/or the reading module 130, the images of the printing image 115 and the reading image 135 are segmented to extract the block image. Meanwhile, as the block size herein, the block size 152 which is calculated by the block and movement amount calculating module 150 is used.

Figure 4:
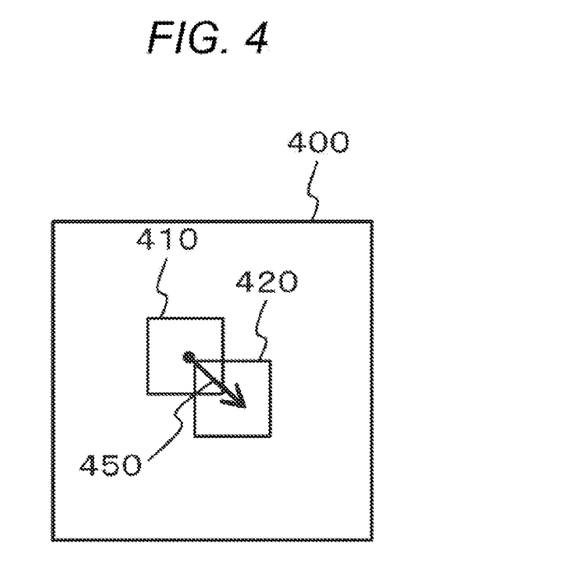
FIG. 4 is an explanation diagram illustrating the processing example in the data collection and position estimation module.

More specifically, the processing is performed as in the following.

into the rectangle generated based on the error which may occur from the recording module 120 and/or the reading module 130, one image of the printing image 115 and the reading image 135 are segmented to extract the rectangle image. One image may be any of the printing image 115 and the reading image 135. Hereinafter, the printing image 115 considered as one image and the reading image 135 considered as the other image will be mainly described. A block segmentation will be described with reference to FIG. 9. FIG. 4 is an explanation diagram illustrating a processing example according to the present embodiment. In an example of (a) of FIG. 9, a reference image 900a is segmented into 9×12 blocks. As a matter of course, a segmented number is changed depending on a block size and a size of the reference image 900a. Further, according to the relationship between the block size and the size of the reference image 900a, the segmented number may not be necessarily segmented into an integer number, but for example, a portion which is not occupied in one block may be added with a white image, and the like. Further, the data collection and position estimation module 140 accepts a block size 152 from the block and movement amount calculating module 150 and segments the reference image 900a into a block.

Figure 9:
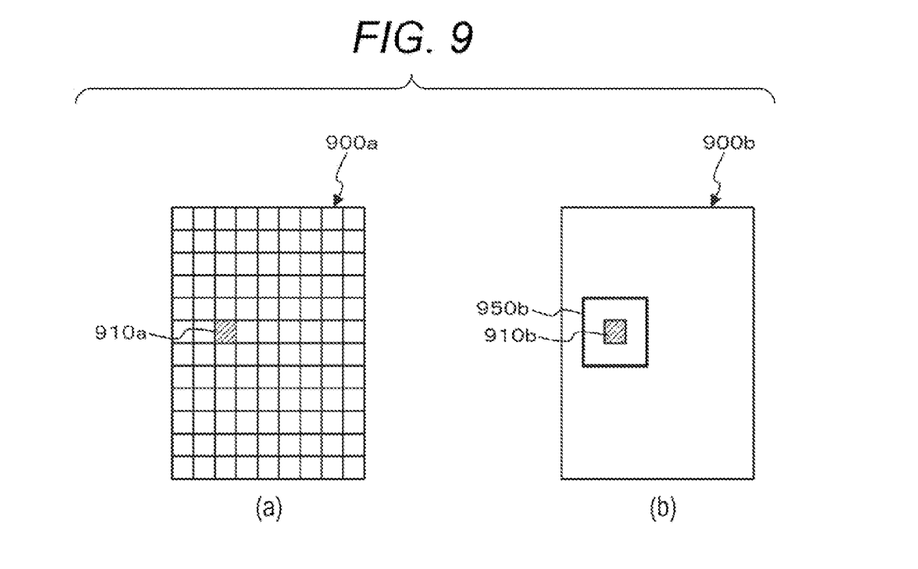
FIG. 9 is an explanation diagram illustrating the processing example according to the embodiment of the present invention.
Figure 10:
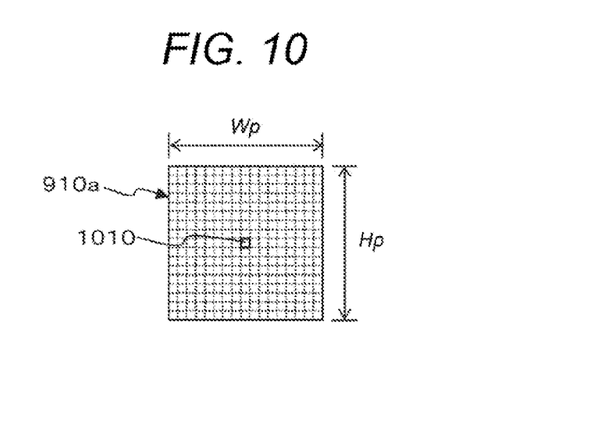
FIG. 10 is an explanation diagram illustrating a block example.

FIG. 10 is an explanation diagram illustrating a block example and enlargedly illustrates a block image 910a illustrated in an example of (a) of FIG. 9. The block image 910a has a size of $W_p \times H_p$. Further, coordinates of a central pixel 1010 of the block image 910a are set to be $C_x$ and $C_y$.

2) As illustrated in an example of (c) of FIG. 3, at least one set of the extracted block images is selected, and in the blocks (the printing image 115 and the reading image 135) at the corresponding position, a difference absolute value between the printing image 115 and the reading image 135 is calculated for each pixel. For example, exclusive OR (EOR) processing may be performed for each pixel.

3) A position at which a sum (a total sum of the difference absolute values in each pixel within the block) of difference absolute values within the block is minimal is searched. Meanwhile, a search range A may be the same as the estimated value 145 of the displacement amount used in the comparison and contrast module 160. The search range A may be different from it. The search range A may be defined from the movement amount 154 which is calculated by the block and movement amount calculating module 150. Alternatively, the search range A may be a search range described below with reference to FIG. 6.

In an example of FIG. 3, a printing block image 310 is searched on a reading block image 320. That is, the positions of the printing block image 310 and the reading block image 320 are changed in the search range A and the sum of difference absolute values in the positional relation is calculated. The positional relation between the rectangular images in which the calculated sum of difference absolute values is minimal is specified. As illustrated in an example of FIG. 4, for the reading block image 420 within the reading image 400, the printing block image 410 is searched. In the search range A, a positional relation 450 in which the sum of difference absolute values is minimal is obtained. The positional relation 450 is, for example, differences Δx and Δy of the central coordinates of the printing block image 410 and the reading block image 420. An example in which the printing block image 310 is searched on the reading block image 320 is described herein, but as a matter of course, the reading block image 320 may be searched on the printing block image 310. In this example, although the block images are cut out from both of the printing image and the reading image, the block images are cut out only from the printing image. In that case, the search range may be directly set into the other image as the reading image, and a position in which the sum of difference absolute values is minimal may be searched. Alternatively, the block images are cut out only from the reading image. In that case, the search range may be directly set into the other image as the printing image, and a position in which the sum of difference absolute values is minimal may be searched.

In this example, the search range A is calculated as in the following.

The data collection and position estimation module 140 determines the range of the movement amount defining the search range A, based on the error which may occur from the recording module 120 recording the image of the printing image 115 on the recording medium 125 and/or the reading module 130 reading the recording medium 125, and the position within the image (whichever of the printing image 115 and the reading image 135 may be used). The 'errors which may occur from the recording module 120 or the reading module 130' will be described below in the description of the block and movement amount calculating module 150. For example, the data collection and position estimation module 140 increases the movement amount in accordance with the distance from the original point in the printing image 115 or the reading image 135, and calculates the movement amount at the farthest point from the original point so that the movement amount by the affine transformation, which is the error that may occur from the recording module 120 or the reading module 130, is maximal in the size of the printing image 115 or the reading image 135. Meanwhile, the distance from the original point has the same value as the position of the block. The original point of the printing image 115 or the reading image 135 is a position at which the occurrence of the error of the recording module 120 or the reading module 130 is minimal, and means, for example, the coordinates of the upper left corner of the image. The 'farthest point from the original point' is the farthest position from the original point. The farthest position from the original point is a position at which the occurrence of the error of the recording module 120 or the reading module 130 is maximal, and means, for example, the coordinates of the lower right corner of the image. In detail, the data collection and position estimation module 140 increases the size of the search range A toward the direction of the coordinate of the lower right corner from the coordinate of the upper left corner. Further, the maximum size is defined by the maximum value of the 'errors which may occur from the recording module 120 or the reading module 130', and is the movement amount 154 which is calculated by the block and movement amount calculating module 150.

Figure 6:
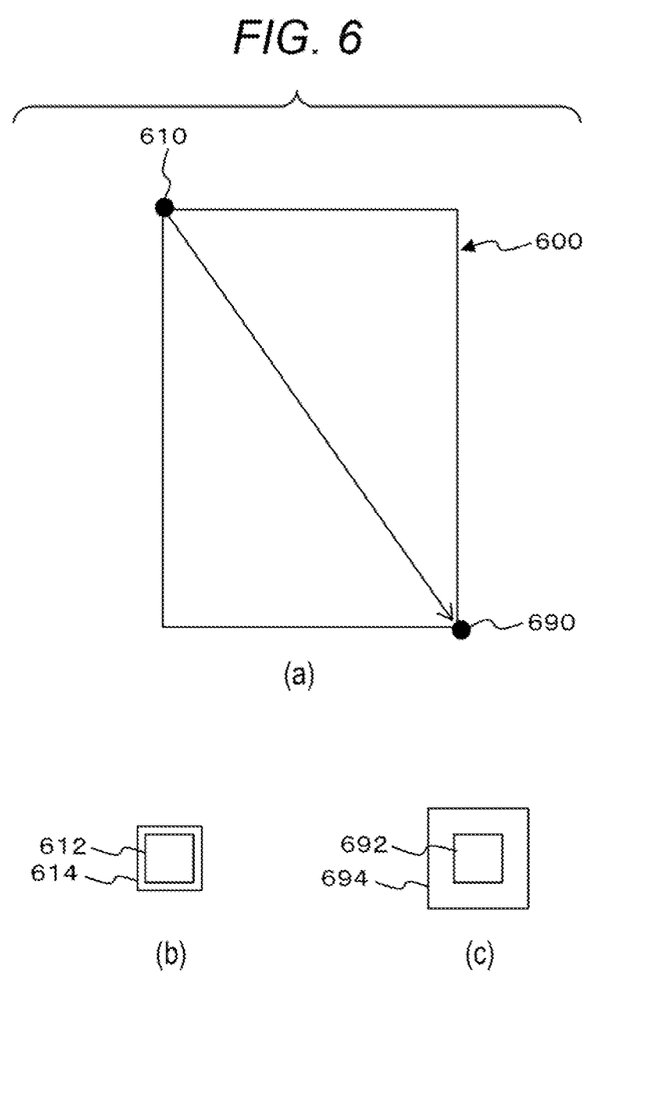
FIG. 6 is an explanation diagram illustrating an example of a size of a search range based on a position within an image.
Figure 13:
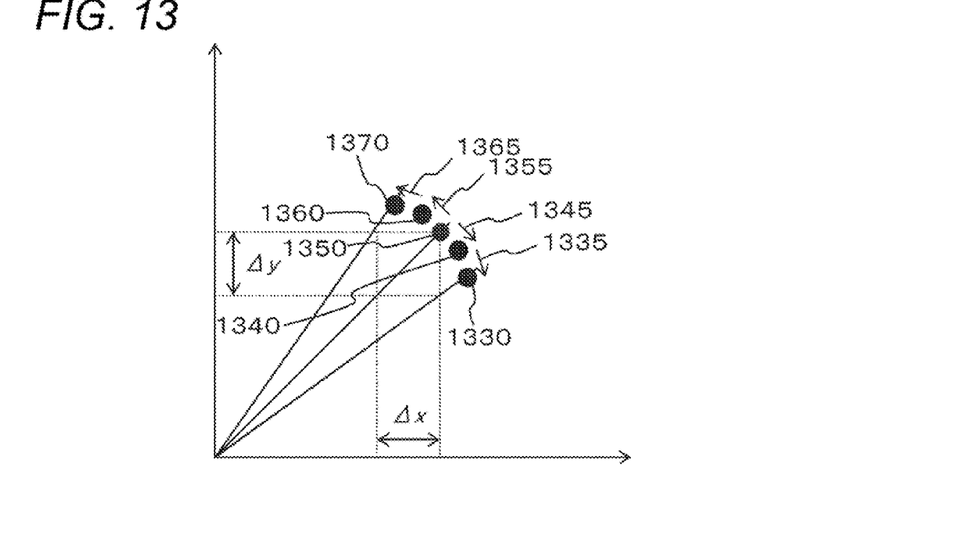
FIG. 13 is an explanation diagram illustrating the processing example of calculating the block size.

This will be described using an example of FIG. 6. FIG. 6 is an explanation diagram illustrating an example of the size of the search range A based on the position within the image. an example of (a) of FIG. 13 illustrates an example of positions of an original point 610 (upper left corner) and a farthest point 690 (lower right corner) in an image 600. Further, an example of (b) of FIG. 13 illustrates the relationship between a block 612 in the original point 610 and a search range A 614. The search range A 614 is large by a predetermined value (0 or more), when comparing with the block 612. An example of (c) of FIG. 13 illustrates the relationship between a block 692 in the farthest point 690 and a search range A 694. The search range A 694 is a size which is defined by the movement amount 154 calculated by the block and movement amount calculating module 150. Meanwhile, the sizes of the block 612 and the block 692 are the same as each other, and are the block size 152 calculated by the block and movement amount calculating module 150. An example in which the upper left corner is defined as the original point and the lower right corner is defined as the farthest point is illustrated herein, but according to a nature of errors which may occur from the recording module 120 or the reading module 130, whichever of the four points (lower right corner, upper right corner, lower left corner, and upper left corner) may be used. Herein, the rotation of the recording module 120 or the reading module 130 is generated based on the upper left corner and the case in which as the rotation is far from the upper left corner, the expansion and contraction has a great effect is described by way of example.

Next, the data collection and position estimation module 140 searches a matching position of the extracted rectangular image within the other image in the search range A using a position in which the sum of difference absolute values is minimal as a reference. For example, (b) of FIG. 9 illustrates an example of searching for the block image 910a illustrated in (a) of FIG. 9. As illustrated in (b) of FIG. 9, the data collection and position estimation module 140 searches for the block image 910a within a search range 950b which is a 'range of movement amount' within a reading image 400b. Meanwhile, the block image 910b within the reading image 900b corresponds to the block image 910a within the reference image 900a. Ideally, (when errors which may occur from the recording module 120 and the reading module 130 are 0), the defects are detected only by comparing the block image 910*a* with the block image 910*b*, but since the errors, which may occur from the recording module 120 and/or the reading module 130, are actually present, the search is performed within the search range 950*b* considering the errors (the search range determined by the data collection and position estimation module 140). Therefore, it is possible to find a position which matches the block image 910*a* within the reading image 900*b* without the need to search for the overall reading image 900*b*. The search range is an area formed as the vertical and horizontal movement amount with a rectangle of the other image being centered, including the rectangle of the other image in the same position as the rectangular position of said one image.

Figure 11:
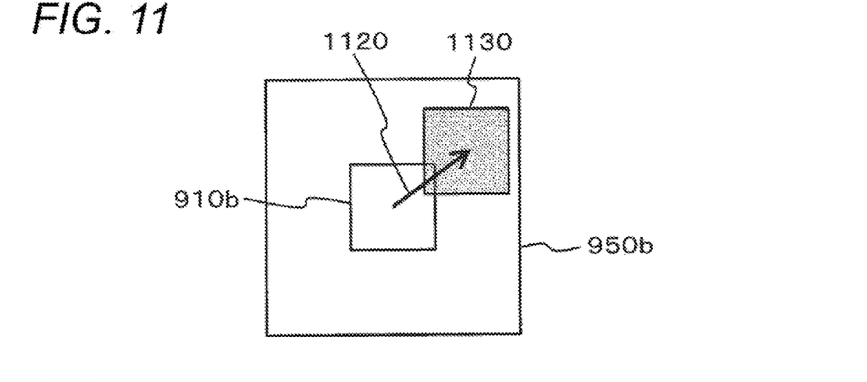
FIG. 11 is an explanation diagram illustrating the processing example using a comparison and contrast module.
Figure 12:
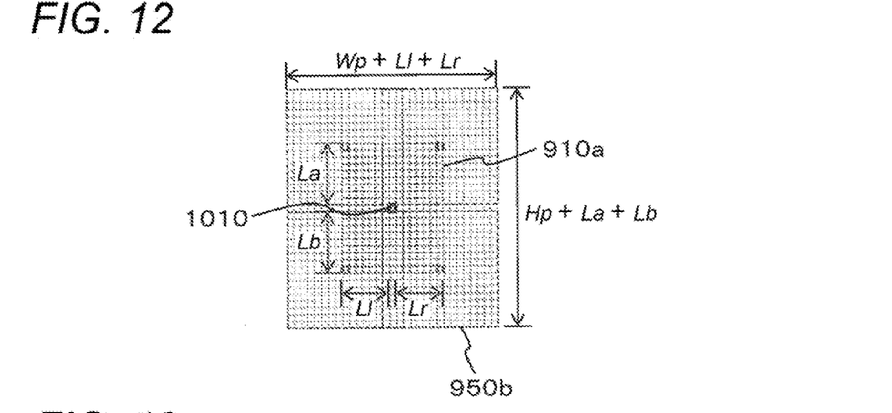
FIG. 12 is an explanation diagram illustrating a relation example between a block image and a search range.

The search processing will be described with reference to FIG. 11. FIG. 11 is an explanation diagram illustrating a processing example by the comparison and contrast module 160. An example illustrated in FIG. 11 enlargedly illustrates the search range 950*b* illustrated in an example of (b) of FIG. 9. The block image 910*a* of the reference image 900*a* moves by one pixel within the search range 950*b* of the reading image 900*b* to perform template matching such as exclusive OR processing. Further, as the result of the template matching, a relative position to the block image having a largest score which demonstrates most approximation within the search range becomes a displacement amount 620. That is, the block image 910*b* corresponds to the block image 910*a* within the search range 950*b*, and as the result of performing the template matching of the block image within the search range 950*b* with the block image 910; when a block image 1130 at a largest score position is extracted, the relative position becomes the displacement amount 1120. Meanwhile, the comparison and contrast module 160 accepts an estimated value 145 of the displacement amount from the data collection and position estimation module 145, thereby searching for the targeted block.

Meanwhile, the block in which the position at which the sum of difference absolute values is minimal may be plural is previously excluded from a target. For example, there are a block of which the whole surface is compactly painted with the same color (for example, white, black, and the like) (a case may be included that although the whole surface is not painted with the exact same color, the variation in the pixel values of the whole surface is below a predetermined value), a block in which only one line is drawn, a block in which a parallel line formed of a plurality of lines is drawn, a block in which the patterns (substantially same patterns) are regularly drawn, and the like. The blocks are not suitable to estimate the search range 145. It is the reason why the corresponding position can not be determined unambiguously, the position of the non-selected block can not be estimated, or the estimated position of the non-selected block has a large error. Timing for excluding from the target may be at the time of selecting the block. The timing may be at the time of estimating the position within the other image after selecting block and searching the corresponding position. Here, the timing for excluding from the target is at the time of selecting the block reduces a calculation amount for unnecessary searching. In addition, the selecting and searching of the block indicates a distance between the rectangular images in which the sum of difference absolute vales is minimal is larger than or equals to a predetermined value, the positional relationship for the selected block is excluded from a base for the position estimation of the other non-selected blocks.

Figure 5:
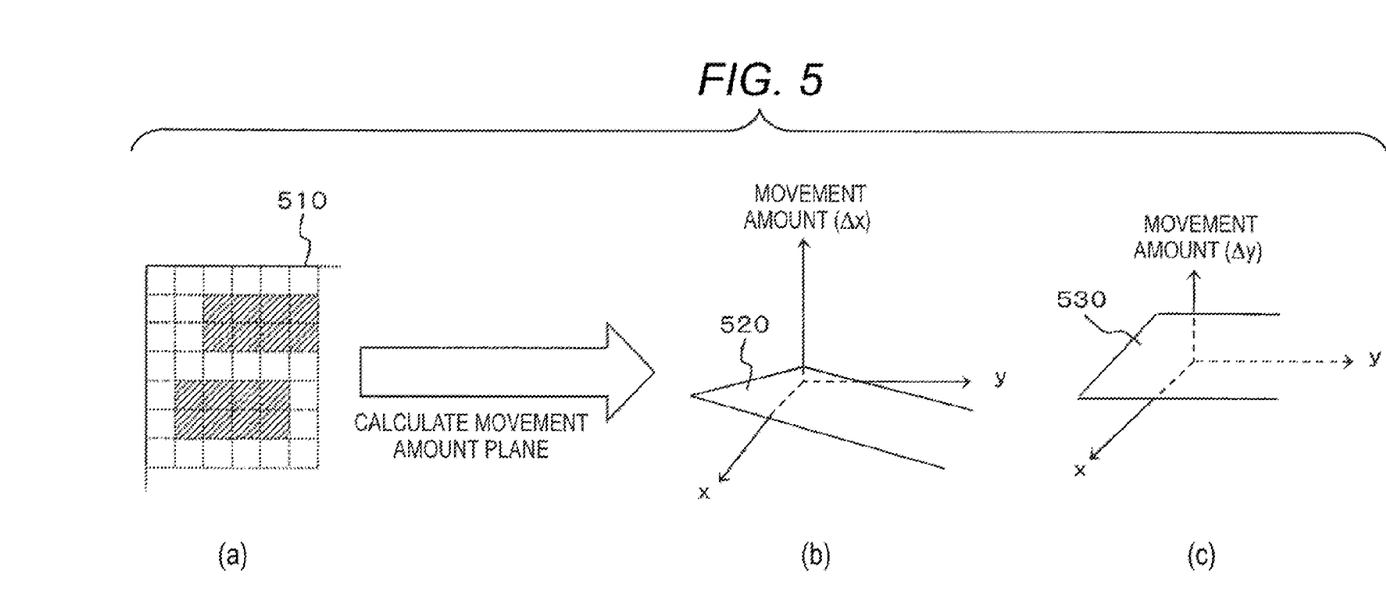
FIG. 5 is an explanation diagram illustrating the processing example in the data collection and position estimation module.

Next, the estimation of a position within the other image for the block which is not selected by the data collection and position estimation module 140 will be described wither reference to FIG. 5. FIG. 5 is an explanation diagram illustrating the processing example in the data collection and position estimation module 140. As illustrated in an example of (a) of FIG. 5, in the block (diagonal block in (a) of FIG. 5) within a printing image 510, the positional relation in which the sum of difference absolute vales is minimal is calculated. Meanwhile, the block (white block in (a) of FIG. 20) excluded from the target is not used in the processing of position estimation.

The data collection and position estimation module 140 calculates a plane in a feature space defined by the positional relation between the block images and estimates the positions of the non-selected blocks based on the plane. In detail, the plane of the displacement amount is calculated from the positional relation in which the sum of difference absolute values is minimal to calculate the displacement amount depending on the positions of each block.

That is, the following processing is carried out. The positional relation $\Delta x$ and $\Delta y$ is plotted in the feature space. As the feature space, there is, for example, a three-dimensional space in which an X axis, a Y axis, and $\Delta x$ or $\Delta y$ as an axis of the image are defined. Herein, the x axis and the y axis are central coordinates of the block. As the feature space, a four-dimensional space in which an x axis, a y axis, a $\Delta x$ axis, and a $\Delta y$ axis of the image are defined may be used, and any space including $\Delta x$ or $\Delta y$ as an axis may be used. The plane configured by the plot is calculated. For example, the plane may be a displacement amount $\Delta x$ plane 520 in the example of (a) of FIG. 5 and a displacement amount $\Delta y$ plane 530 in the example of (b) of FIG. 5. As a matter of course, all the plots are not necessarily present on the plane, and a plane estimated from these plots is sufficient to be calculated using the existing method.

The displacement amount in all the blocks within the image may be estimated using the plane indicating the displacement amount. In detail, the positions of each block are substituted into Equations $\Delta x = a_1 x + b_1 y\, c_1$ and $\Delta y = a_2 x\, b_2 y + c_2$ representing the plane to estimate the displacement amount in each block. Here, the estimation of the displacement amount needs to be performed to at least non-selected block images. When this processing is executed in sequential processing, a case that only the non-selected block images are specified is processed more quickly than a case that all the block images are specified. This is because the calculation amount for the estimation of the displacement amount is reduced. When this processing is executed in parallel processing using such as a multi-core CPU and a GPU, a case that all the block images are uniformly specified is processed more quickly than a case that a step for determining as to whether a block image is selecting target or not is further added.

Next, the data collection and position estimation module 140 searches for each block image, a corresponding position within the other image based on the displacement amount estimated by the method discussed above. The search range is set on the basis of the estimated displacement amount, the template matching is performed, and the position having the most proximity between the images within the search range is searched. Template matching similar to the template matching discussed above can be used as this template matching. Here, the searching is performed to at least non-selected block images. When this processing is executed in sequential processing, a case that only the non-selected block images are specified is processed more quickly than a case that all the block images are specified. This is because the calculation amount for the searching is reduced. When this processing is secondly executed in parallel processing using such as a multi-core CPU and a GPU, a case that all the block images are uniformly specified is processed more quickly than a case that a step for determining as to whether a block image is target or not is further added. The search range may be determined in a similar way to the method for determining the search range discussed above. Since the position for the non-selected blocks has been estimated, smaller range would be employed as the search range in this processing. It reduces the calculation amount for difference extraction.

The comparison and contrast module 160 is connected to the image generating module 110, the reading module 130, and the data collection and position estimation module 140. The comparison and contrast module 160 compares and contrast the printing image 115 with the reading image 135 to detect whether defects are present and an area in which defects occurs. That is, the comparison and contrast module 160 accepts the printing image 115 and the reading image 135. The reading image 135 is read from the recording medium 125 on which an image of the printing image 115 is formed. That is, the comparison and contrast module 160 receives the original printing image 115 which is a print out target and the reading image 135 which is obtained by printing out the printing image 115 and scanning the printed out recording medium 125. This is to check whether defects occurring by the recording module 120 and the reading module 130 are present. Herein, the defect is called noise and ideally, completely matches the printing image 115 and the reading image 135. However, the defects occur due to maintenance situations of the recording module 120 and the reading module 130, and the like. Meanwhile, errors may occur in the recording module 120 and the reading module 130. Herein, an 'error which may occur' is an error which is tolerable in a design specification of the recording module 120 and the reading module 130. Examples of the error include, in detail, an affine transformation of expansion and contraction, rotation, and movement. As the error, for example, when the design specification in which the rotation is not generated at an x degree or more is realized (a design target is achieved), the rotation below the x degree may be generated.

Therefore, the comparison and contrast module 160 is to extract the defects (for example, black pixel mixing of 3 pixels or more) except for errors which may occur from the recording module 120 and the reading module 130. That is, it is checked whether defects other than the errors, which are tolerable in the design specification, occur, to specify positions at which the defects occur, thereby assisting the maintenance of the recording module 120 and the reading module 130.

Next, the comparison and contrast module 160 accepts the search result from the data collection and the position estimation module 140 and compares the extracted rectangular image with the image at the corresponding portion within the other image (the image of the search result). That is, the most matching position between the rectangular image on the printing image side and the rectangular image on the reading image side are overlapped to extract differences. The 'search result' is a result of extracting a position at which one image best matches the other image by comparing the rectangular images within the one image, in the search range of the other image. A difference between the position and a position of the rectangular image may be set to be the displacement amount. The 'compare' may include using the search result. That is, since the search result is the best matched case, the matched degree may be set as a defect detection result 165. Further, the defect detection result 165 may include the displacement amount in addition to the matched degree.

Figure 7:
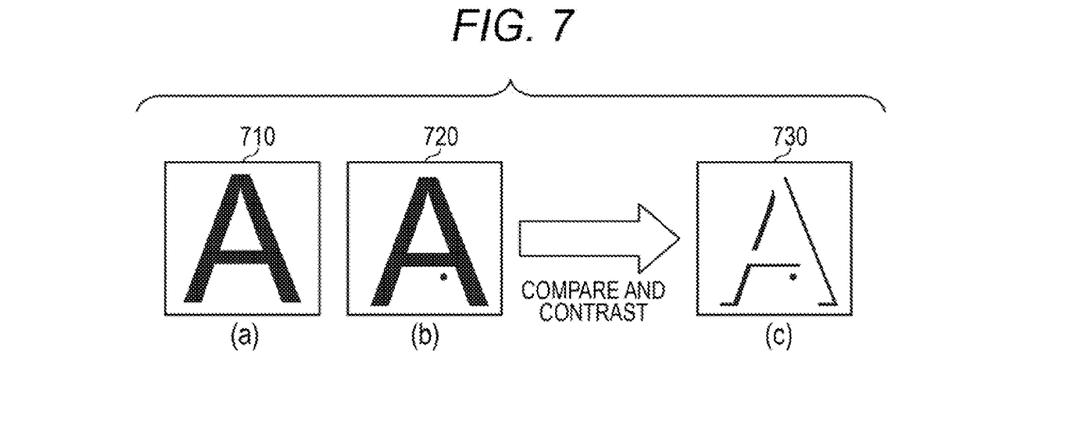
FIG. 7 is an explanation diagram illustrating a processing example of detecting a defect.

This will be described with reference to FIG. 7. FIG. 7 is an explanation diagram illustrating a processing example of the defect detection by the comparison and contrast module 160. A printing block image 710 illustrated in an example of (a) of FIG. 7 is the block image within the printing image 115, a reading block image 720 illustrated in an example of (b) of FIG. 7 is the block image within the reading image 135, and a difference block image 730 illustrated in an example of (c) of FIG. 7 is a difference (result of exclusive OR processing) between the printing block image 710 and the reading block image 720. The comparison and contrast module 160 generates difference images for each block and detects the defects within the difference images. As the defects, for example, the defect that one side of a circumscribed rectangle has a size of a predetermined range (for example, from three pixels to five pixels, and the like) may be detected.

The block and movement amount calculating module 150 is connected to the data collection and position estimation module 140. The block and movement amount calculating module 150 calculates the block size 152 and the movement amount 154 based on the error which may occur from the recording module 120 and/or the reading module 130. Further, the block size 152 and the movement amount 154 are delivered to the data collection and position estimation module 140. Examples of the error of the recording module 120 or the reading module 130 include the affine transformation in an image forming apparatus or an image reading apparatus. In a detailed example, the error includes an expansion and contraction rate, a rotation angle, and the like. Meanwhile, the processing by the block and movement amount calculating module 150 is sufficient to be carried out prior to carrying out the processing by the data collection and position estimation module 140 and the block size 152 and the movement amount 154 may be previously calculated and stored in the data collection and position estimation module 140. Further, to cope with the errors from the recording module 120 and the reading module 130 which are used at that time, the block and movement amount calculating module 150 may accept errors from the recording module 120 and the reading module 130 to calculate the block size 152 and the movement amount 154 each time.

The block size 152 is set so that a pixel shift between the rectangular image of one image and the rectangular image of the other image is within one pixel due to the affine transformation. Meanwhile, the calculation of the block size 152 will be described with reference to an example of FIG. 13.

In the size of the printing image 115 or the reading image 135, the movement amount 154 due to the affine transformation is defined to be maximal. The movement amount 154 is to form the search range 950b. FIG. 7 is an explanation diagram illustrating a relation example between the block image 910a and the search range 950b. The movement amount 154 includes, in detail, an upper direction movement amount, a lower direction movement amount, a left direction movement amount, and a right direction movement amount.

A length (block height) of the block image 910a is $L_a+1+L_b$ and is $H_p$ illustrated in an example of FIG. 5.

A width (block width) of the block image 910a is $L_l+1+L_r$ and is $W_p$ illustrated in the example of FIG. 5.

The length (height of the search range) of the search range 950b is $H_p+L_a+L_b$. $L_a$ is the upper direction movement amount. $L_b$ is the lower direction movement amount.

The width (width of the search range) of the search range 950b is $W_p+L_l+L_r$. $L_l$ is the left direction movement amount. $L_r$ is the right direction movement amount.

Figure 14:
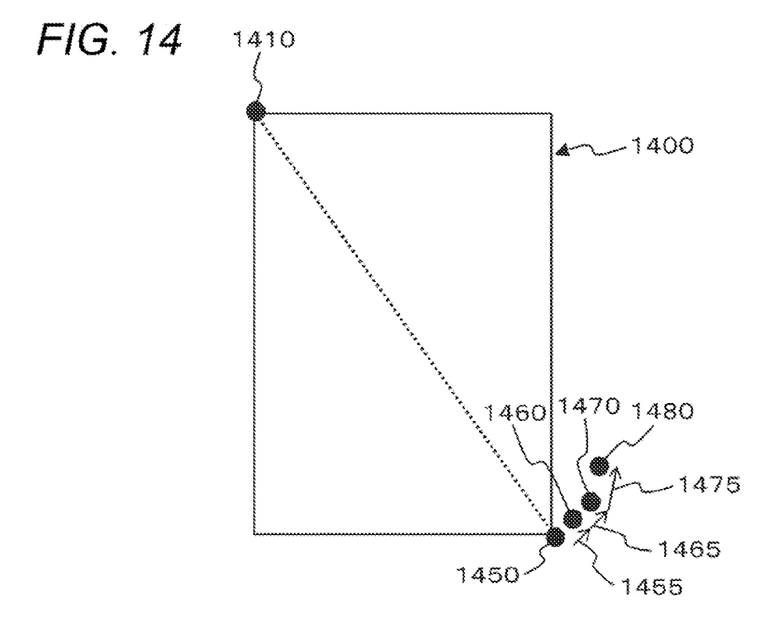
FIG. 14 is an explanation diagram illustrating the processing example of calculating the movement amount.
Figure 15:
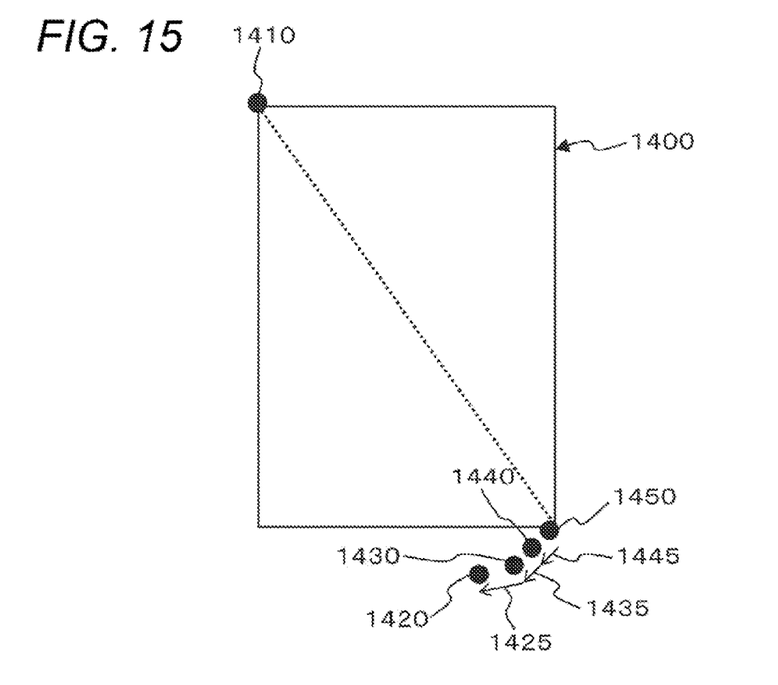
FIG. 15 is an explanation diagram illustrating the processing example of calculating the movement amount.

Meanwhile, the calculation of the movement amount 154 will be described with reference to examples of FIGS. 14 and 15.

The movement amount 154 indicates a maximum value within the search range in the image. The data collection and position estimation 140 determines the estimated value 145 of the displacement amount using the movement amount 154 on the basis of the position of the block within the image.

a processing example according to the present embodiment is described.

Firstly, the image generating module 110 converts the printing data 105 into an image to generate the printing image 115.

Next, the recording module 120 records the printing image 115 on the recording medium 125.

Next, the reading module 130 reads the recording medium 125 on which the printing image 115 is recorded. the read result is the reading image 135.

Next, the data collection and position estimation module 140 obtains data for determining the estimated value 145 of the movement amount.

Next, the data collection and position estimation module 140 estimates the movement amount of each block.

The comparison and contrast module 160 compares and contrasts the conversion image (printing image 115) with the reading image 135 to detect an area in which defects occurs.

Figure 2:
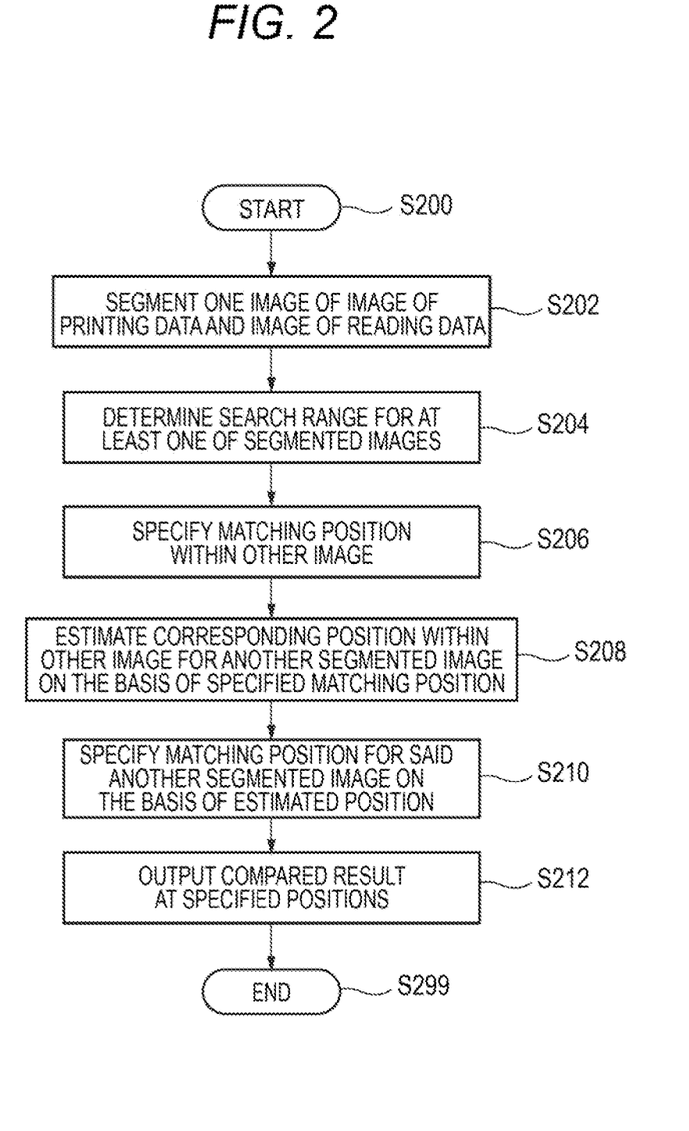
FIG. 2 is a flow chart illustrating a processing example according to the embodiment of the present invention.

FIG. 2 is a flow chart illustrating a processing example according to the embodiment.

In step S202, at least one image of the image of the printing data and the image of reading data is segmented. In this segmenting method, the image is segmented to have a size calculated using an error (for example, as the error becomes larger, the size becomes smaller).

In step S204, the search range is determined for at least one of the segmented images. The search range is determined to have a size calculated using the error (for example, as the error becomes large, the size becomes larger).

In step S206, the corresponding position within the other image is specified. Specifically, the segmented image is overlapped into the other image to acquire difference for each pixel. The addition of the difference absolute value is performed while changing the position of the image within the search range. The position having the smallest difference is regarded as the corresponding position.

In step S208, the corresponding position within the other image for another segmented image is estimated on the basis of the specified corresponding position. Specifically, the shift amount is drawn in the plane between the corresponding position and the initial position. The shift degree of the other segmented image is estimated from the plane and the position of the segmented image relative to the segment source.

In step S210, for the other segmented image, the corresponding position within the other image is specified on the basis of the estimated position. The search range in step S210 may be the same as that of step S204, a narrower search range than the search range determined in step S204 can be employed. This is because the corresponding position is closer for the searched segmented image due to the search beginning from the position estimated in step S208. The narrower search range reduces the calculation amount of difference calculation for specifying the corresponding position.

In step S212, the compared result at the specified positions is output. The different at the time of specifying the corresponding position may be output as the compared result as it is. The difference may be output by processing the image (for example, the difference is emphasized).

Figure 8:
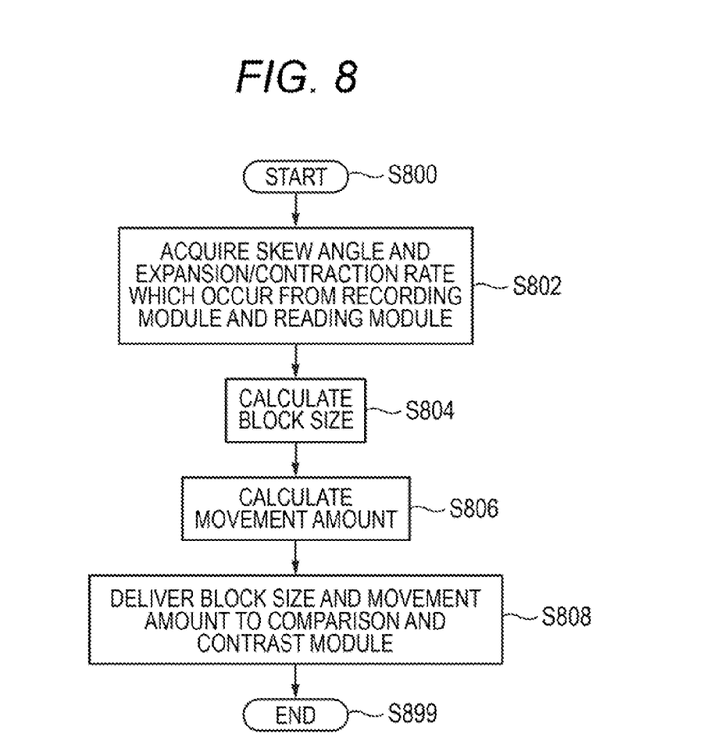
FIG. 8 is a flow chart illustrating a processing example of calculating a block size and a movement amount.

FIG. 8 is a flow chart illustrating a processing example in which the block and movement amount calculating module 150 calculates the block size 152 and the movement amount 154.

In step S802, the expansion and contraction rate and the rotation angle (skew angle) which may be generated from the recording module 120 and the reading module 130 are acquired.

In step S804, the block size is calculated.

In step S806, the movement amount is calculated.

In step S808, the block size 152 and the movement amount 154 are delivered to the position estimation module 140 and the comparison and contrast module 160.

FIG. 13 is an explanation diagram illustrating a processing example of calculating the block size 152. When both the rotation and the expansion and contraction by the recording module 120 and the reading module 130 are generated in the worst state, the block size is set so that when a center of the block of the printing image 115 coincides with a center of the block of the reading image 135, the pixel shift at each corner is within 1 pixel.

The example of FIG. 13 illustrates how a point 1350 within the printing image 115 is shifted by the errors from the recording module 120 and the reading module 130.

The point 1350 moves to a point 1360 by the movement (at the time of maximum contraction in both scanning directions) 1355 due to expansion and contraction. Further, the point 1350 moves to a point 1370 by a movement (counterclockwise) 1365 due to the skew. This corresponds to the case in which the contraction is maximal (smallest) and the counterclockwise rotation is maximal.

The point 1350 moves to a point 1340 by the movement (at the time of maximum expansion in the both scanning directions 1345 due to the expansion and contraction. Further, the point 1350 moves to a point 1330 by a movement (clockwise) 1335 due to the skew. This corresponds to the case in which the expansion is maximal (largest) and the clockwise rotation is maximal.

(1) When in both scanning directions, the contraction is maximal (x-axis direction magnification: $r_1$ and y-axis direction magnification: $r_2$) and the skew is maximal (counterclockwise, rotation angle $\alpha$), if the movement amount of a point on a diagonal line which has the maximum movement amount based on a center of a block as an original point is calculated as (1, 1), the movement amount is represented by the following Equation (1).

[Equation 1]

$$\begin{bmatrix} \cos(\alpha) & -\sin(\alpha) \\ \sin(\alpha) & \cos(\alpha) \end{bmatrix} \begin{bmatrix} r_1 \\ r_2 \end{bmatrix} = \begin{bmatrix} x_1 \\ y_1 \end{bmatrix} \quad (1)$$

A difference $\Delta x$ of x in the case of a straight line passing through the point and y=1 as an original straight line is calculated. In the example of FIG. 8, the difference $\Delta x$ is defined by a straight line passing through the point 1350, the original point, and the point 1370 and a straight line of which y=1.

(2) Meanwhile, when in both scanning directions, the expansion is maximal (x-axis direction magnification: $r_3$ and y-axis direction magnification: $r_4$) and the skew is maximal (clockwise, rotation angle $\beta$), if the movement amount of a point on a diagonal line which has the maximum movement amount based on a center of a block as an original point is calculated as (1, 1), the movement amount is represented by the following Equation (2).

[Equation 2]

$$\begin{bmatrix} \cos(\beta) & \sin(\beta) \\ -\sin(\beta) & \cos(\beta) \end{bmatrix} \begin{bmatrix} r_3 \\ r_4 \end{bmatrix} = \begin{bmatrix} x_2 \\ y_2 \end{bmatrix} \quad (2)$$

A difference Δy of y in the case of a straight line passing through the point and x=1 as an original straight line is calculated. In the example of FIG. 8, the difference Δy is defined by a straight line passing through the point 1350, the original point, and the point 1330 and a straight line of which x=1. (3) y' and x' in which Δx and Δy are 1.4 are calculated. Further, if the width and height of the block are W and H, the width and height are represented by the following Equation (3).

[Equation 3]

$$W = 2*\text{ceil}(x')+1,\; H = 2*\text{ceil}(y')+1 \quad (3)$$

Meanwhile, ceil( ) is a function which rounds off below the decimal point.

Therefore, the block size 152 (W and H of Equation (3)) may be calculated. For example, the width and height of the block each become 100 pixels and 110 pixels, and the like.

Next, a processing example of calculating the movement amount 154 (size of search range) will be described using examples of FIGS. 14 and 15.

In the case in which all of the rotation, the expansion and contraction, and the movement by the recording module 120 and the reading module 130 are worst, the movement amount 154 is set to be able to consider the movement amount at the lower right corner in a certain paper size (for example, A elongation paper). Meanwhile, in the following coordinates, an upper left corner is defined to be an original point, a right direction and a lower direction are defined to be a positive value direction, and the rotation angle in a clockwise direction is defined to be a positive value direction.

Under the condition in which the movement amount in the upper right direction is maximal, the movement amount of the lower right corner (for example, coordinates (3897 and 5763) at 300 dpi in the A3 elongation paper), which has the maximum movement amount based on the upper left corner in a certain paper size as the original point, is calculated as represented by the following Equation (4).

[Equation 4]

$$M = M_{skew} + M_{size} + M_{shift} \quad (4)$$

However, $M_{skew}$ represents the movement amount by the skew, $M_{size}$ represents the movement amount by the expansion and contraction, and $M_{shift}$ represents the movement amount by the shift.

Here, the $M_{skew}$, the $M_{size}$, and the $M_{shift}$ each are represented by the following Equations (5), (6), and (7).

[Equation 5]

$$M_{skew} = \begin{cases} 3897 - \{3897 \times \cos(\gamma) - 5763 \times \sin(\gamma)\} = \\ M_{askew} \text{ pixel(main scanning direction)} \\ 5763 - \{3897 \times \sin(\gamma) + 5763 \times \cos(\gamma)\} = \\ M_{bskew} \text{ pixel(sub-scanning direction)} \end{cases} \quad (5)$$

[Equation 6]

$$M_{size} = \begin{cases} 3897 \times r_5 - 3897 = M_{asize} \text{ pixel(main scanning direction)} \\ 5763 \times r_6 - 5763 = M_{bsize} \text{ pixel(sub-scanning direction)} \end{cases} \quad (6)$$

[Equation 7]

$$M_{shift} = \begin{cases} s_1 \div 25.4 \times 300 = M_{ashift} \text{ pixel(main scanning direction)} \\ s_2 \div 25.4 \times 300 = M_{bshift} \text{ pixel(sub-scanning direction)} \end{cases} \quad (7)$$

Meanwhile, γ represents the rotation angle, $r_5$ and $r_6$ represent the expansion and contraction rate, and $s_1$ and $s_2$ represent the movement amount.

Therefore, γ, $r_5$ and $r_6$, and $s_1$ and $s_2$ are represented by the follow Equation (8).

[Equation 8]

$$M = \begin{cases} M_{askew} + M_{asize} + M_{ashift} = M_a \text{ pixel(main scanning direction)} \\ M_{bskew} + M_{bsize} + M_{bshift} = M_b \text{ pixel(sub-scanning direction)} \end{cases} \quad (8)$$

This will be described using an example of FIG. 14. FIG. 14 is an explanation diagram illustrating the processing example of calculating the movement amount.

A point 1450 moves to a point 1460 by a movement (maximal in the upper right direction) 1455 due to the shift. Further, the point 1450 moves to a point 1470 by a movement (at the time of the maximum expansion in a main scanning direction and the maximum contraction in a sub-scanning direction) 1465 due to the expansion and contraction. Further, the point 1450 moves to a point 1480 by a movement (counterclockwise) 1475 due to the skew. That is, at the farthest point (lower right corner) from an original point 1410 (upper left corner in FIG. 9) of an image 1400, the maximum movement amount in the upper direction and the right direction is calculated.

Meanwhile, under the condition in which the movement amount in the lower left direction is maximal, the movement amount of the lower right corner (for example, A3 elongation paper), which has the maximum movement amount based on the upper left corner in a certain paper size as the original point, is calculated as represented by the following Equations (9), (10), and (11).

[Equation 9]

$$M_{skew} = \begin{cases} 3897 - \{3897 \times \cos(\theta) - 5763 \times \sin(\theta)\} = \\ M_{cskew} \text{ pixel(main scanning direction)} \\ 5763 - \{3897 \times \sin(\theta) + 5763 \times \cos(\theta)\} = \\ M_{dskew} \text{ pixel(sub-scanning direction)} \end{cases} \quad (9)$$

[Equation 10]

$$M_{size} = \begin{cases} 3897 \times r_7 - 3897 = M_{csize} \text{ pixel(main scanning direction)} \\ 5763 \times r_8 - 5763 = M_{dsize} \text{ pixel(sub-scanning direction)} \end{cases} \quad (10)$$

[Equation 11]

$$M_{shift} = \begin{cases} s_3 \div 25.4 \times 300 = M_{cshift} \text{ pixel(main scanning direction)} \\ s_4 \div 25.4 \times 300 = M_{dshift} \text{ pixel(sub-scanning direction)} \end{cases} \quad (11)$$

Meanwhile, θ represents the rotation angle, $r_7$ and $r_8$ represent the expansion and contraction rate, and $s_3$ and $s_4$ represent the movement amount.

Therefore, θ, $r_7$ and $r_8$, and $s_3$ and $s_4$ are represented by the follow Equation (12).

[Equation 12]

$$M = \begin{cases} M_{cskew} + M_{csize} + M_{cshift} = M_c \text{ pixel(main scanning direction)} \\ M_{dskew} + M_{dsize} + M_{dshift} = M_d \text{ pixel(sub-scanning direction)} \end{cases} \quad (12)$$

This will be described using an example of FIG. 10. FIG. 10 is an explanation diagram illustrating the processing example of calculating the movement amount.

The point 1450 moves to a point 1440 by a movement (maximal in the lower left direction) 1445 due to the shift. Further, the point 1450 moves to a point 1430 by a movement (at the time of the maximum contraction in the main scanning direction and the maximum expansion in the sub-scanning direction) 1435 due to the expansion and contraction. Further, the point 1450 moves to a point 1420 by a movement (clockwise) 1425 due to the skew. That is, at the farthest point (lower right corner) from the original point 1410 (upper left corner in FIG. 10) of the image 1400, the maximum movement amount in the upper direction and the left direction is calculated.

From the above description, the upper direction maximum value, the lower direction maximum value, the left direction maximum value, and the right direction maximum value of the movement amount are each calculated. For example, the maximum values each are 67.41 pixels, 95.99 pixels, 58.73 pixels, and 62.47 pixels, and the movement amounts in the vertical and horizontal directions of the block each are a minimum of 68 pixels, 96 pixels, 59 pixels, and 63 pixels. Meanwhile, actually, since the recording module 120 and the reading module 130 may be out of the specification (spec over), the movement amounts may be set to be large by a predetermined value. This value indicates movement amount from the original point 1410 to the farthest point 1450. The movement amount (search range) at the position except for the point 1450 may be determined by the data collection and position estimation module 140 on the basis of the position and the movement amount at the point 1450.

Figure 16:
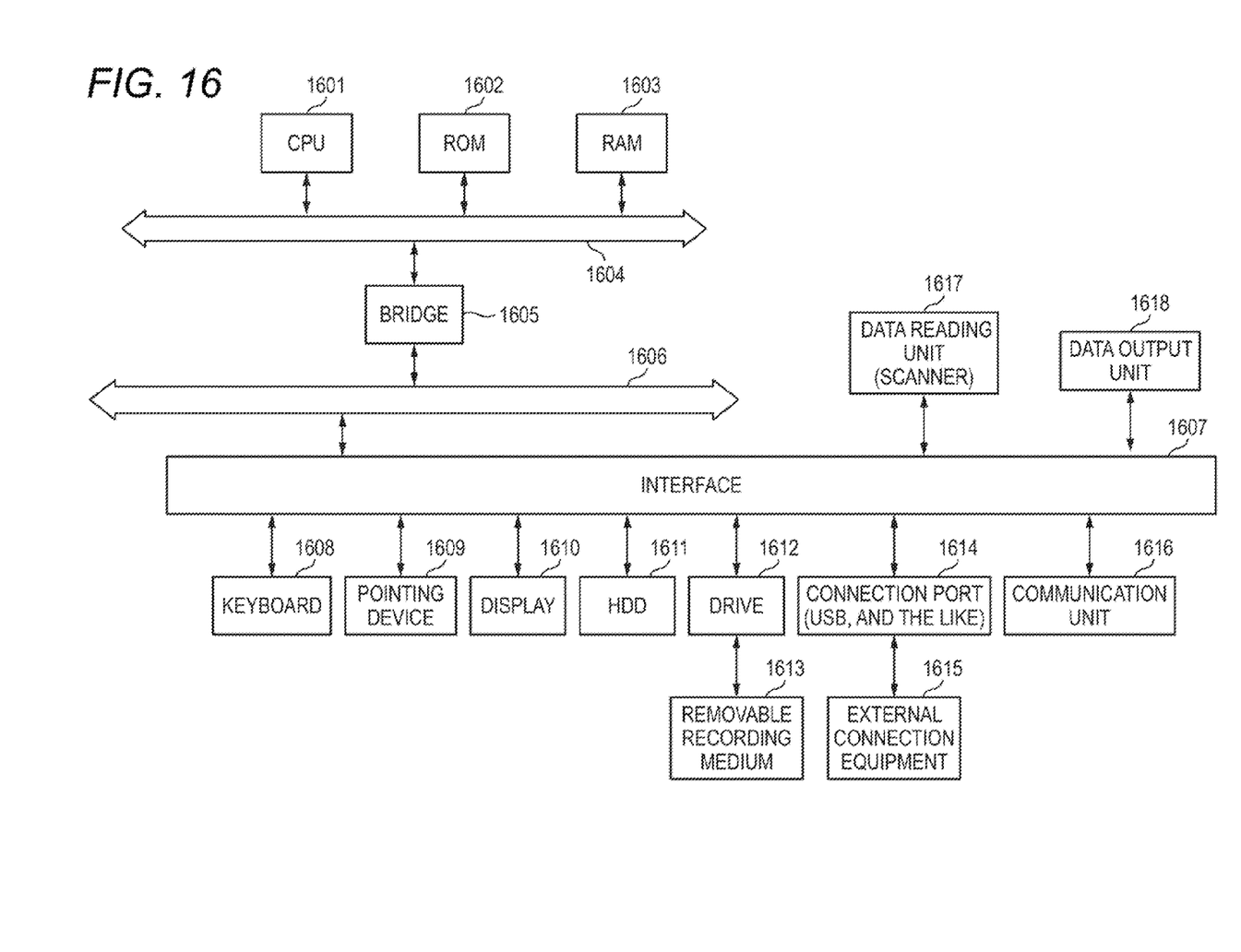
FIG. 16 is a block diagram illustrating a hardware configuration example of a computer realizing the present embodiments.

A hardware configuration example of the image processing apparatus according to the present embodiment will be described with reference to FIG. 16. The configuration illustrated in FIG. 16 is configured by, for example, a personal computer (PC), and the like, and a hardware configuration example including a data reading unit 1617 such as a scanner and a data output unit 1618 such as a printer is illustrated.

A central processing unit (CPU) 1601 is a control unit which carries out processing according to computer programs which describe an execution sequence of each module of various modules described in the above-mentioned embodiments, that is, the data collection and position estimation module 140, the comparison and contrast module 160, the image generating module 110, the block and movement amount calculating module 150, and the like.

A read only memory (ROM) 1602 stores programs, operation parameters, and the like which are used by the CPU 1601. A random access memory (RAM) 1603 stores programs which are used in the execution by the CPU 1601, parameters appropriately changed in the execution, and the like. These components are connected to each other by a host bus 1604 which is configured of a CPU bus, and the like.

The host bus 1604 is connected to an external bus 1606, such as a peripheral component interconnect/interface) bus, via a bridge 1605.

A pointing device such as a keyboard 1608 and a mouse is an input device which is operated by an operator. As a display 1610, there are a liquid crystal display device, a cathode ray tube (CRT), and the like, and the display 1610 displays various types of information as a text or image information.

A hard disk drive (HDD) 1611 includes a hard disk and drives the hard disk to record or reproduce programs or information which is executed by the CPU 1601. The hard disk stores the printing data 105, the printing image 115, the reading image 135, the block size 152, the movement amount 154, and the estimated value 145 of the displacement amount, and the like. Further, the hard disk stores various computer programs such as other various data processing programs.

A drive 1612 reads data or programs which are recorded in removable recording media 1613, such as a magnetic disk, an optical disk, and a magneto-optical disk which are mounted therein or a semiconductor memory, and supplies the data or the programs to the RAM 1603 connected via an interface 1607, the external bus 1606, the bridge 1605, and the host bus 1604. The removable recording medium 1613 may also be used as a data recording region like the hard disk.

A connection port 1614 is a port which connects an external connection equipment 1615 and has connection units, such as USB and IEEE1394. The connection port 1614 is connected to the CPU 1601 via the interface 1607, the external bus 1606, the bridge 1605, the host bus 1604, and the like. A communication unit 1616 is connected to a communication line to carry out the data communication processing with the outside. The data reading unit 1617 is, for example, a scanner and carries out reading processing of a document. The data output unit 1618 is, for example, a printer and carries out output processing of document data.

Meanwhile, the hardware configuration of the image processing apparatus illustrated in FIG. 22 represents one configuration example, and the present embodiment is not limited to the configuration illustrated in FIG. 22, but any configuration which may carry out the modules described in the present embodiments may be used. For example, some modules may be configured of dedicated hardware (for example, application specific integrated circuit (ASIC), and the like), and may have a form that the modules are connected to each other by the communication line within the external system, and the systems illustrated in FIG. 22 may be connected to each other by a plurality of mutual communication lines to perform the cooperative operation. Further, the system may be embedded in a copier, a facsimile, a scanner, a printer, a multi-function printer (image processing apparatus having at least two functions of the scanner, the printer, the copier, the facsimile, and the like), and the like.

Meanwhile, the present embodiment may be the image processing apparatus including the data collection and position estimation module 140 and the comparison and contrast module 160 and may include the block and movement amount calculating module 150, the reading module 130, the recording module 120, and the image generating module 110.

Meanwhile, the aforementioned programs may be stored and provided in the recording medium and may be provided by the communication means. In this case, for example, the aforementioned programs may be understood as the invention of 'computer readable recording medium recorded with program'.

The 'computer readable recording medium recorded with program' means a recording medium which may be readable with a computer recorded with programs which are used for install and execution of the programs, distribution of the programs, and the like.

Meanwhile, examples of the recording medium may include a digital versatile disc (DVD), 'DVD-R, DVD-RW, DVD-RAM, and the like' which are standards set in a DVD forum, 'DVD+R, DVD+RW, and the like' which are standards set in DVD+RW, a compact disc (CD), a Blu-ray (registered mark) disc such as a read only memory (CD-ROM), a CD recordable (CD-R), and CD rewritable (CD-RW), a magneto-optical disc (MO), a flexible disc (FD), a magnetic tape, a hard disk, a read only memory (ROM), an electrically erasable and programmable read only member (EEPROM (registered mark)), a flash memory, a random access memory (RAM), a secure digital (SD) memory card, and the like.

The programs or some of the programs may be recorded and stored in the recording medium or may be distributed. Further, the programs may be transmitted by using communication, for example, a transmission medium such as a wired network, a wireless communication network, or a combination thereof which is used in a local area network (LAN), a metropolitan area network (MAN), a wide area network (WAN), the Internet, the Intranet, the Extranet, and the like, and may be carried on a carrier wave to be carried.

In addition, the programs may be a part of other programs and may be recorded in the recording medium along with separate programs. Further, the programs may be separately recorded in a plurality of recording media. Further, if the programs may be recovered, the programs may be recorded in any aspect such as compression and encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
a processor;
an acceptance unit, operable on the processor, that accepts image data and reading data read by an image reading apparatus from a medium on which an image of the image data is formed by an image forming apparatus;
an extraction unit, operable on the processor, that extracts rectangular images by segmenting one image of the image data and the reading data to have a size based on a tolerable error which occurs from the image forming apparatus and/or the image reading apparatus, the tolerable error being predetermined in design specification of the image forming apparatus and the image reading apparatus;
a first searching unit, operable on the processor, that searches for a matching position of a selected rectangular image in the other image of the image data and the reading data within a search range, the selected rectangular image being selected from at least one of the rectangular images, and the search range being set from the tolerable error;
an estimation unit, operable on the processor, that estimates a matching position of a rectangular image in the other image on the basis of the matching position of the selected rectangular image in the other image;
a second searching unit, operable on the processor, that searches for a matching position of the other rectangular image in the other image using the matching position estimated by the estimation unit as a reference; and
a comparison unit, operable on the processor, that compares the rectangular image extracted by the extraction unit with a corresponding rectangular image in the other image.

2. The image processing apparatus of claim 1, wherein the estimation unit estimates the matching position of the rectangular image except the selected rectangular image in the other image.

3. The image processing apparatus of claim 1, wherein the second searching unit searches for the matching position of the other rectangular image in the other image in a narrower search range than the search range of the first searching unit.

4. The image processing apparatus of claim 1, wherein the selected image is not a rectangular image of which the whole surface is compactly painted with the same color, a rectangular image in which only one line is drawn, a rectangular image in which a parallel line formed of a plurality of lines is drawn, nor a rectangular image in which patterns are regularly drawn.

5. The image processing apparatus of claim 1, wherein the second searching unit does not use the matching position of the selected rectangular image shifts over a predetermined value as the reference.

6. The image processing apparatus of claim 1, wherein the error is obtained from an affine transformation in the image forming apparatus or the image reading apparatus, and a size of the rectangle is set so that a pixel shift between the rectangular image of said one image and the corresponding rectangular image of the other image is within one pixel due to the affine transformation.

7. The image processing apparatus of claim 1, wherein the estimation unit calculates a plane determined by the positions of the selected rectangular images, and the estimation unit estimates the position of the rectangular image in the other image which is not selected by the first searching unit on the basis of the plane.

8. A non-transitory computer readable medium storing a program causing a computer to execute a process for image processing, the process comprising:
accepting image data and reading data read by an image reading apparatus from a medium on which an image of the image data is formed by an image forming apparatus;
extracting rectangular images by segmenting one image of the image data and the reading data to have a size based on a tolerable error which occurs from the image forming apparatus and/or the image reading apparatus, the tolerable error being predetermined in design specification of the image forming apparatus and the image reading apparatus;
searching for a matching position of a selected rectangular image in the other image of the image data and the reading data within a search range, the selected rectangular image being selected from at least one of the rectangular images, and the search range being set from the tolerable error;
estimating a matching position of a rectangular image in the other image on the basis of the matching position of the selected rectangular image in the other image;
searching for a matching position of the other rectangular image in the other image using the estimated matching position as a reference; and
comparing the extracted rectangular image with a corresponding rectangular image in the other image.

* * * * *